(12) United States Patent
Mani et al.

(10) Patent No.: US 12,253,127 B2
(45) Date of Patent: Mar. 18, 2025

(54) BRAKE DUST TRAP FOR A DRUM BRAKE

(71) Applicant: Volvo Truck Corporation, Gothenburg (SE)

(72) Inventors: Boopathy Mani, Bangalore (IN); Sundar Vignesh Alavandar, Chennai Tamil Nadu (IN)

(73) Assignee: Volvo Truck Corporation, Gothenburg (SE)

( * ) Notice: Subject to any disclaimer, the term of this patent is extended or adjusted under 35 U.S.C. 154(b) by 467 days.

(21) Appl. No.: 17/624,606

(22) PCT Filed: Jul. 2, 2020

(86) PCT No.: PCT/EP2020/068665
§ 371 (c)(1),
(2) Date: Jan. 4, 2022

(87) PCT Pub. No.: WO2021/008887
PCT Pub. Date: Jan. 21, 2021

(65) Prior Publication Data
US 2022/0275841 A1    Sep. 1, 2022

(30) Foreign Application Priority Data
Jul. 16, 2019 (IN) .............................. 201941028672

(51) Int. Cl.
*F16D 65/00* (2006.01)
*F16D 65/10* (2006.01)

(52) U.S. Cl.
CPC ......... *F16D 65/0031* (2013.01); *F16D 65/10* (2013.01)

(58) Field of Classification Search
CPC ............. F16D 65/10; F16D 2065/1316; F16D 2065/1312; F16D 65/0031; F16D 65/0043;
(Continued)

(56) References Cited

U.S. PATENT DOCUMENTS 1,737,325 A * 11/1929 Olivier .................... F16D 65/10
188/218 A
1,966,169 A * 7/1934 Forbes ................... F16D 65/827
188/218 R
(Continued)

FOREIGN PATENT DOCUMENTS

AT           244785 B      1/1966
CN         108386464 A     8/2018
(Continued)

OTHER PUBLICATIONS

First Office Action for Chinese Patent Application No. 202080050814. X, mailed Nov. 22, 2023, 9 pages.
(Continued)

*Primary Examiner* — Robert A. Siconolfi
*Assistant Examiner* — Mahbubur Rashid
(74) *Attorney, Agent, or Firm* — Withrow & Terranova, PLLC

(57) ABSTRACT

A brake dust trap for a drum brake, the brake dust trap having an annular shape arranged to be received in a groove formed circumferentially in a drum of the drum brake to trap particulate matter generated by the drum brake, wherein the brake dust trap is arranged to be retained in the groove to rotate along with the drum, and removable from the drum brake for disposal of trapped particulate matter.

12 Claims, 4 Drawing Sheets

(58) Field of Classification Search
CPC ..... F16D 65/0037; F16D 27/02; B21D 53/34; B60T 1/067; B60T 1/065; B60B 7/00; B22D 19/08
See application file for complete search history.

(56) References Cited

U.S. PATENT DOCUMENTS

| | | | | |
|---|---|---|---|---|
| 3,127,959 | A * | 4/1964 | Wengrowski | F16D 65/827 |
| | | | | 188/218 R |
| 4,674,606 | A * | 6/1987 | Denton | F16D 65/10 |
| | | | | 188/264 R |
| 4,989,697 | A * | 2/1991 | Denton | F16D 65/827 |
| | | | | 188/264 R |
| 6,155,650 | A * | 12/2000 | Barger | F16D 65/847 |
| | | | | 188/264 AA |
| 7,989,697 | B2 * | 8/2011 | Huang | H05K 5/0004 |
| | | | | 361/600 |
| 9,291,222 | B2 | 3/2016 | Hummel et al. | |
| 2014/0054121 | A1 | 2/2014 | Hummel et al. | |
| 2018/0031059 | A1 * | 2/2018 | Gelb | F16D 65/0031 |

FOREIGN PATENT DOCUMENTS

| | | |
|---|---|---|
| DE | 957185 C | 1/1957 |
| DE | 102016108793 A1 | 11/2017 |
| DE | 102017008421 A1 * | 3/2019 |
| DE | 102019210997 A1 * | 1/2021 |
| EP | 0124419 B1 * | 3/1988 |
| KR | 980010000 A * | 4/1998 |
| WO | WO 8201574 A1 * | 5/1982 |
| WO | 2005091838 A2 | 10/2005 |
| WO | WO 2020114635 A1 * | 6/2020 |

OTHER PUBLICATIONS

Notification to Grant for Chinese Patent Application No. 202080050814.X, mailed Jan. 6, 2024, 4 pages.

International Search Report and Written Opinion for International Patent Application No. PCT/EP2020/068665, mailed Nov. 6, 2020, 12 pages.

* cited by examiner

BRAKE DUST TRAP FOR A DRUM BRAKE

This application is a 35 USC 371 national phase filing of International Application No. PCT/EP2020/068665, filed Jul. 2, 2020, which in turn claims priority to Indian patent application Ser. No. 20/194,1028672, filed Jul. 16, 2019, the disclosures of which are incorporated herein by reference in their entireties.

TECHNICAL FIELD

The invention relates to arrangements for capturing and holding particulate matter generated during braking. The disclosed brake dust traps are particularly suitable for use in drum brakes.

The invention can be applied in heavy-duty vehicles, such as trucks, buses and construction equipment.

BACKGROUND

Friction braking devices such as drum brakes generate dust from wear of the brake drum, from the brake drum linings, and from the brake shoes. Brake dust generated during braking is a major environmental concern faced by the automotive industry. Brake dust comprises harmful particulate matter from, e.g., glass, friction material, and metals such as copper and iron. Such particulate matter is harmful to, e.g., humans and aquatic life, and contributes to environmental pollution in general.

It is desired to prevent this particulate matter from escaping the brake device into the environment, and to collect and dispose of it in a safe and controlled way.

WO 82/01574 discloses a brake drum where a collector member has been fitted outside of the brake drum to collect dust particles generated during braking. The collector member is arranged to be emptied regularly by a service technician. Emptying the collector member may not always be so easy and may require trained personnel.

There is a need for improved more efficient ways of collecting and disposing of the potentially harmful particulate matter generated in brake devices such as drum brakes.

SUMMARY

An object of the invention is to provide improved ways to collect and dispose of brake dust. This object is at least in part obtained by a brake dust trap for a drum brake. The brake dust trap has an annular shape arranged to be received in a groove formed circumferentially in a drum of the drum brake to trap particulate matter generated by the drum brake. The brake dust trap is arranged to be retained in the groove to rotate along with the drum. The brake dust trap is also configured to be removable from the drum brake for disposal of the trapped particulate matter.

This way brake dust is prevented from escaping the brake and cause harm as discussed above. The brake dust can be conveniently and safely disposed of by removing the dust trap from the brake drum. The dust trap may either be disposable or re-usable.

According to aspects, the brake dust trap is arranged separable into a plurality of segments. This simplifies insertion of the dust trap into the brake drum, and also facilitates convenient removal of the dust trap during replacement.

According to aspects, the brake dust trap is arranged to be retained in the groove by any of a snap fit mechanism or an interference fit mechanism, or a combination of the two. Both snap fit mechanisms and interference type retention means are cost efficient and allow for convenient fitting of the dust trap into the brake drum, which is an advantage. Loose parts, such as fasteners and the like, is avoided.

According to aspects, the brake dust trap comprises a plurality of protruding portions extending radially inwards from the brake dust trap, spaced apart by indentations. This 'accordion-like' configuration provides an increased surface area for engaging and trapping the dust, thereby providing a more efficient dust trapping mechanism.

According to aspects, the brake dust trap comprises a porous material configured to absorb and to hold particulate matter. The porous material can be, e.g., a filter fabric which is relatively cheap and easy to manufacture. It is an advantage that any porous filter material able to withstand a reasonable level of heat can be used.

According to aspects, the brake dust trap comprises a magnetic material configured to attract and to hold magnetic particulate matter. Thus, the trap becomes more efficient when it comes to retaining magnetic dust from, e.g., the brake drum or other metal parts in the drum brake.

According to aspects, the brake dust trap comprises a sticky, adhesive, or viscid surface portion configured to adhere to and to hold particulate matter. This way an efficient trapping and holding mechanism is provided which works on all types of particulate matter.

According to aspects, the brake dust trap comprises one or more recesses extending radially inwards from the brake dust trap perimeter to match and to mate with corresponding protrusions formed in the groove. This means that only brake dust traps which match a given brake drum groove protrusion pattern can be fitted in the brake drum groove. This ensures that a correct trap is fitted, e.g., in terms of dimensions and composition.

There is also disclosed herein brake drums, drum brakes, and vehicles associated with the above mentioned advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
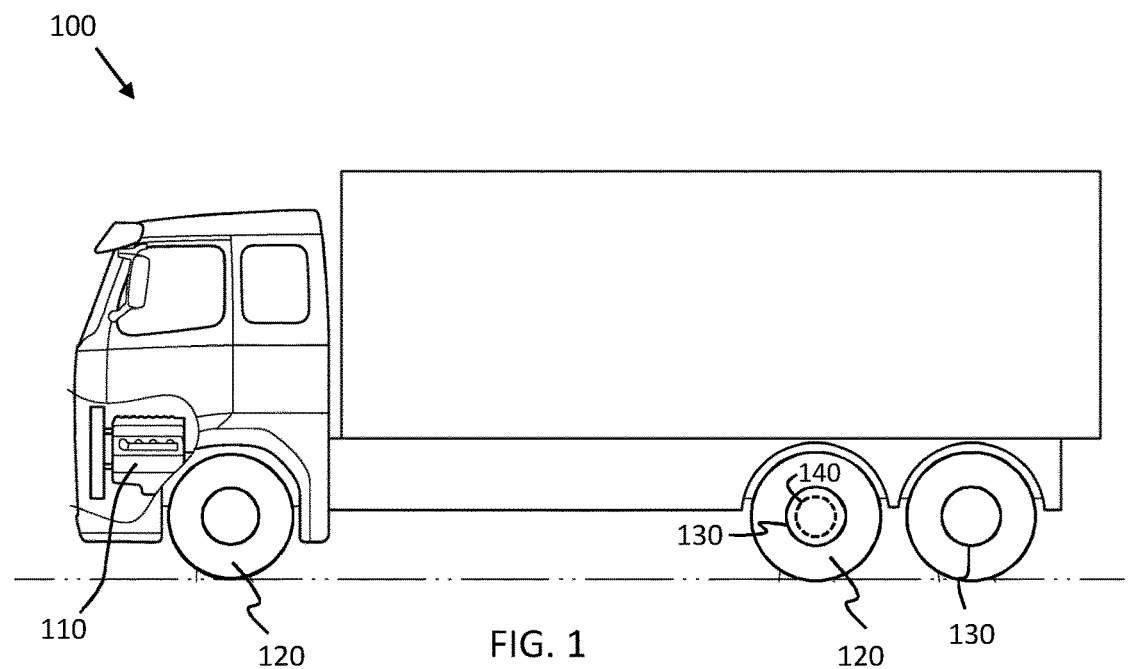
FIG. 1 is a vehicle.

Aspects of the present disclosure will now be described more fully with reference to the accompanying drawings. The different devices and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

FIG. 1 shows a vehicle 100 comprising a power source 110, here exemplified by a combustion engine. The power source is used to drive wheels 120 of the vehicle. At least some of the wheels comprise braking devices to reduce vehicle speed and to maintain the vehicle in a parked position. The vehicle 100 is equipped with drum brakes 140 arranged in connection to wheel rims 130.

A drum brake is a brake that uses friction caused by a set of shoes or pads that press outward against a rotating cylinder-shaped part called a brake drum. The term drum brake usually means a brake in which shoes press on the inner surface of the drum. When shoes press on the outside of the drum, it is usually called a clasp brake. Where the drum is pinched between two shoes, similar to a conventional disc brake, it is sometimes called a pinch drum brake, though such brakes are relatively rare. A related type called a band brake uses a flexible belt or "band" wrapping around the outside of a drum. The present disclosure mainly relates to the type of drum brake where shoes press radially outwards on the inner surface of the drum.

Figure 2:
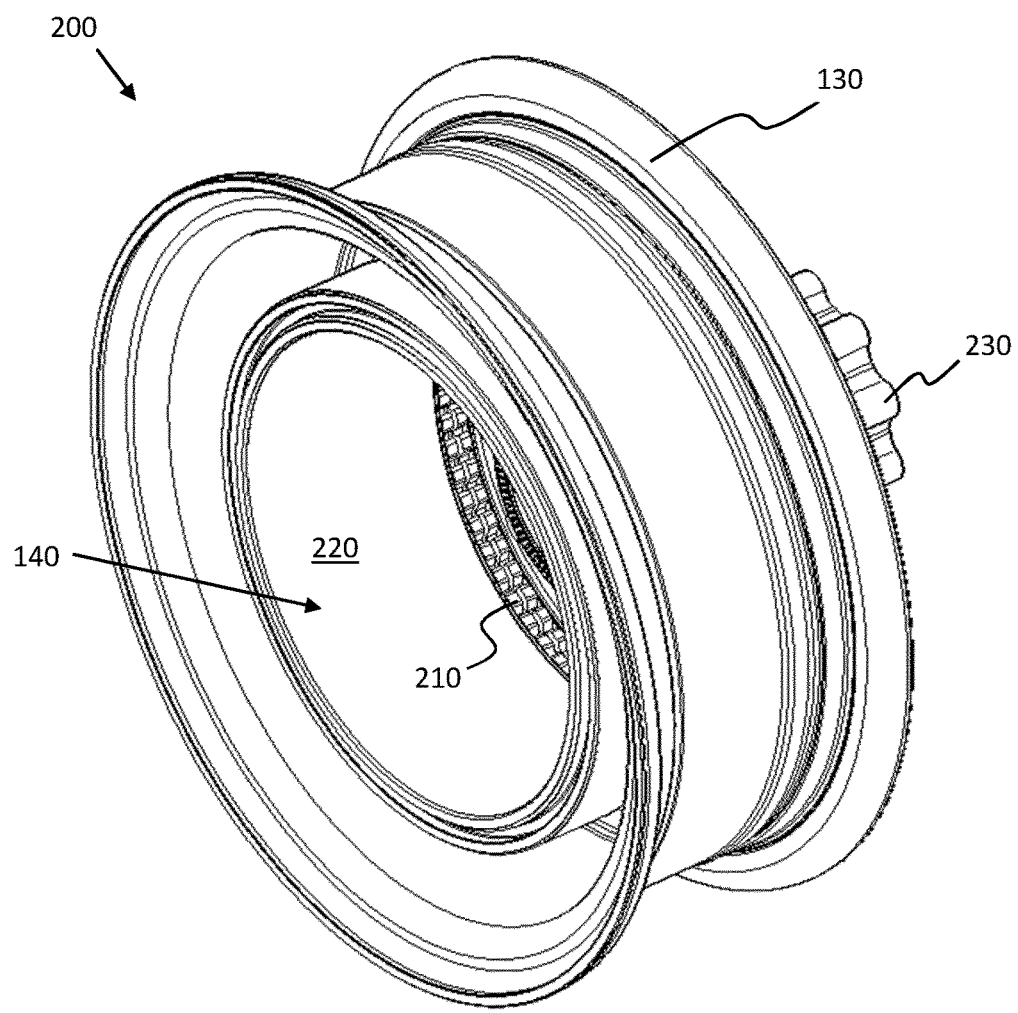
FIGS. 2-3 show an example wheel rim with a brake drum.

FIG. 2 shows a wheel rim 130 and a drum 220 of a drum brake 140. Parts of the wheel hub 230 is also shown in FIG. 2. Drum brakes 140 and friction brakes are known in general, and details thereof will therefore not be discussed herein.

This example drum brake 140, however, comprises a brake dust trapping arrangement which is configured inside the brake drum 220 to collect and to hold dust generated during braking. A brake dust trap 210 is arranged in the interior of the brake drum 220 where it traps, i.e., absorbs generated dust. The dust is then held by the dust trap and can be disposed of in a safe and controlled manner by removing the dust trap 210 from the drum brake 140. For instance, during intervals of service which require accessing the brake drum 220, e.g., during change of brake liners, shoes etc., the brake dust trap 210 can be removed and disposed of safely and replaced with a new one.

Figure 3:
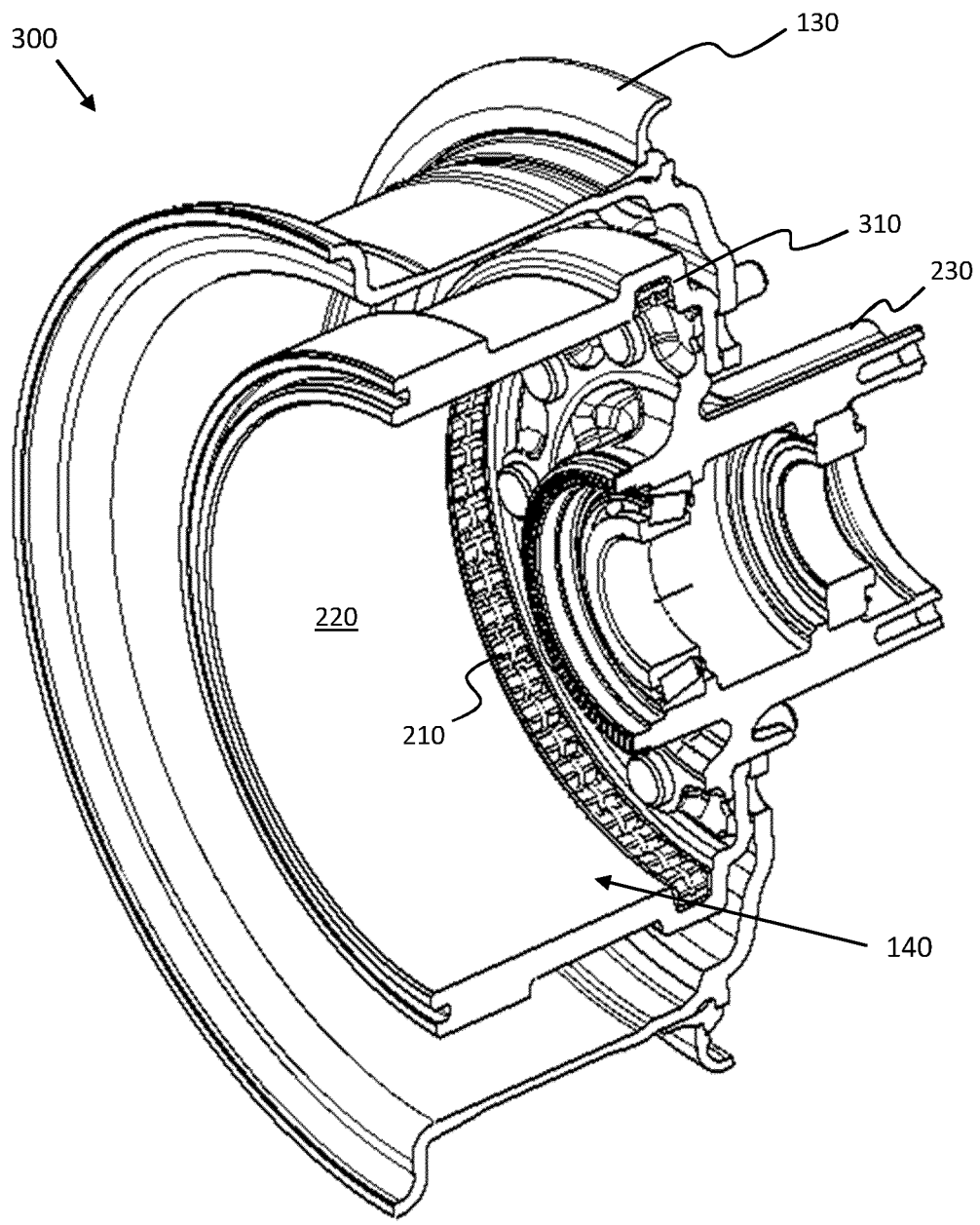

FIG. 3 shows a cross-sectional view of the drum brake 140 with the dust trap 210. There is illustrated a brake dust trap 210 for a drum brake 140. The brake dust trap 210 has an annular shape arranged to be received in a groove 310 formed circumferentially in the drum 220 of the drum brake 140 to trap particulate matter generated by the drum brake 140. The groove 310 is located where brake dust tends to accumulate. The dust is trapped by the brake dust trap 210 both as the wheel rotates, and also when the vehicle is not moving. Brake dust may be trapped in many ways, some of which will be described below. The example in FIG. 3 comprises pockets configured to accumulate brake dust.

Figure 4:
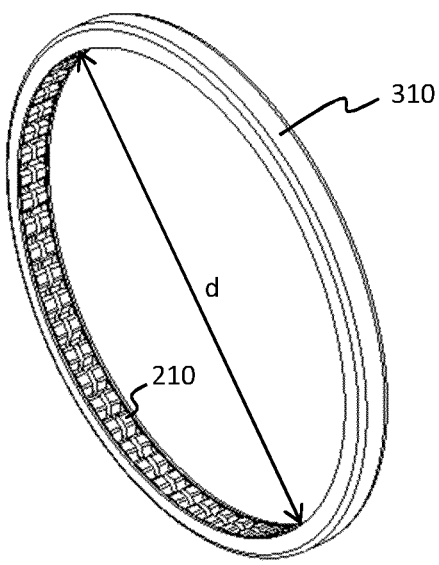
FIGS. 4-6 show details of an example brake dust trap.
Figure 5:
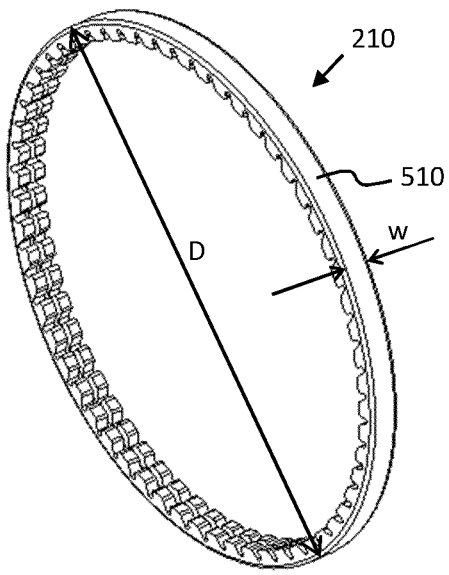

The annular shape is exemplified in FIG. 5. The brake dust trap 210 has a width w corresponding to the width of the groove 310, and an external diameter D configured to fit a corresponding diameter measure of the groove 310. The internal diameter d, indicated in FIG. 4, is preferably on the order of the interior diameter of the brake drum 220. The position of the brake dust trap 210 relative to the drum 220 can be varied along the width of the braking surface depending on the width of the brake shoe and the diameter of the brake drum 220. The shape of the brake dust trap 210 can be varied as per the packaging dimensions of the brake shoe and brake drum sleeve. It is furthermore appreciated that the shape of the brake dust trap may need to be configured in dependence of the amount of dust generated in a service interval. The larger the amount of dust the higher the dust retaining capacity of the trap needs to be, e.g., requiring larger sized pockets or indentations 620.

According to an example, the width w is on the order of 24 mm, with an external diameter D of approximately 444 mm.

Differently from, e.g., the brake dust trap disclosed in WO 82/01574, the brake dust trap 210 is configured inside the brake drum 220 and arranged to be retained in the groove 310 to rotate along with the drum 220. This allows the dust trap 210 to more efficiently trap dust inside the brake drum and not just dust escaping the brake device to an exterior of the brake drum.

The brake dust trap 210 is configured to be removable from the drum brake 140 for disposal of the trapped particulate matter. Thus, when the dust trap has trapped an amount of dust, it can be removed from the brake drum 220 and disposed of, or it can be cleaned and re-used.

To retain the brake dust trap 210 in the groove 310, any of a snap fit mechanism and/or an interference fit mechanism can be used. An interference fit, also known as a press fit or friction fit is a fastening between two parts which is achieved by friction after the parts are pushed together, rather than by any other means of fastening.

A snap-fit is an assembly method used to attach flexible parts to form the final product by pushing the parts' interlocking components together. There are a number of variations in snap fits, including cantilever, torsional and annular. Snap fits are an alternative to assembly using, e.g., threaded fasteners, and have the advantages of speed and cost efficiency.

Figure 7:
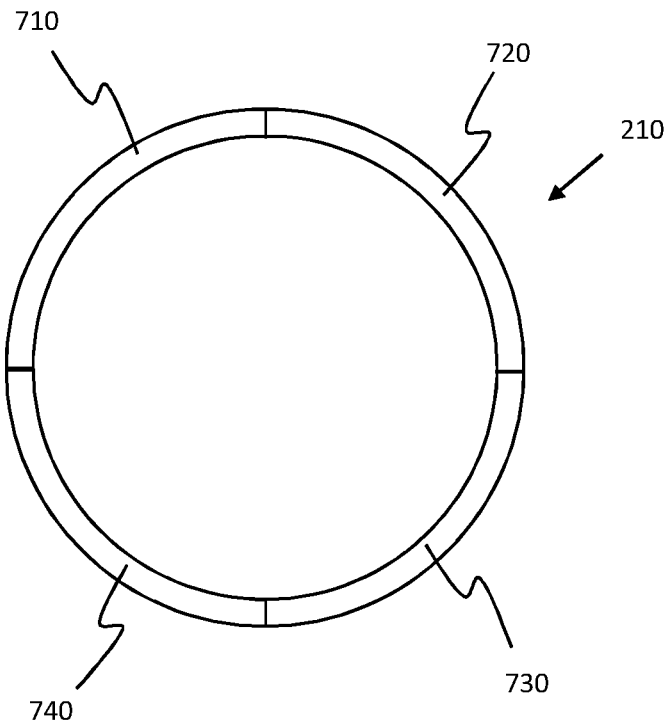
FIG. 7 schematically illustrates sections of a brake dust trap.

To facilitate convenient mounting and removal of the dust trap, the brake dust trap can be arranged separable into a plurality of segments 710, 720, 730, 740, as illustrated in FIG. 7. The segments can then be inserted into the brake drum 220 one after the other, which may be easier than getting the entire annular structure into the groove at one time. The segmentation may also facilitate removal from the brake drum 220 when the dust trap is to be replaced. The different segments may be configured with snap fit arrangements, or just pressed into the groove adjacent to each other.

Figure 6:
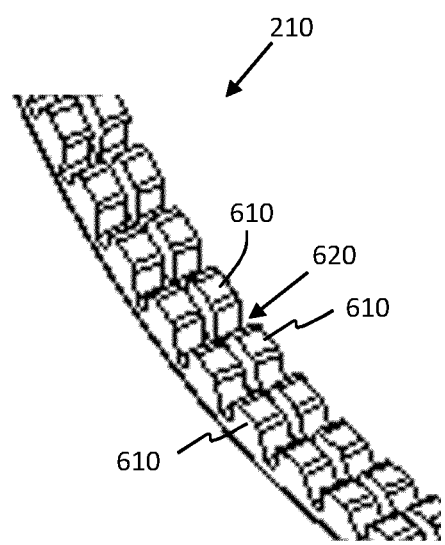

According to aspects, with reference to FIG. 6, the brake dust trap 210 comprises a plurality of protruding portions 610 extending radially inwards from the brake dust trap, spaced apart by indentations 620 or pockets. This geometrical arrangement provides for a larger area with which dust can be trapped.

To trap the dust, the brake dust trap 210 may comprise a porous filter material configured to absorb and to hold particulate matter. The brake dust trap 210 may also comprise a magnetic material configured to attract and to hold magnetic particulate matter, and/or a sticky, adhesive, or viscid surface portion configured to adhere to and to hold particulate matter. It is noted that a combination of different dust trapping mechanisms may be used in combination or separately.

In general, the brake dust trap 210 may be formed from any porous filter material which is able to filter and collect the dust generated during braking, and which is also able to withstand high temperatures in the range of +150 degrees Celsius and above.

The brake dust trap 210 may further comprise a protrusion or other geometrical configuration which is matched to a corresponding geometrical configuration in the groove, 310. For instance, the brake dust trap 210 may comprise one or more recesses 810, shown in FIG. 8, extending radially inwards from the brake dust trap 210 perimeter 510 to match and to mate with corresponding protrusions 820 formed in the groove 310. This way it becomes more difficult to use a generic dust trap with a specific brake drum 220, since the recess 810 formed in the brake dust trap 210 needs to be matched geometrically to the 'key' protrusion shape 820 in the groove 310. In other words, the nature of fitment of the trap into the brake drum 220 can be made unique to secure aftermarket business, which is an advantage. Also, the protrusions 820 can be configured in dependence of the dust trap dimensions. This way, it becomes impossible or at least difficult to fit a dust trap having the wrong dimensions into a given brake drum groove 310.

There is also disclosed herein a drum brake 140 with a brake drum 220 comprising a groove 310 formed circumferentially in the drum 220 of the drum brake 140. The groove 310 is arranged to receive and to retain the brake dust trap 210 discussed above.

According to aspects, the groove 310 is formed in the drum 220 on a hub 230 side of a brake shoe of the drum brake. This means that the dust trap 210 is located to the side of the wheel hub, where most dust tends to gather. The preferred location of the dust trap relative to the brake drum 220 is best seen in FIG. 3, where it is shown adjacent to the wheel hub 230. The position of the groove 310 enclosing the brake dust trap is preferably chosen keeping in mind the area where the brake dust predominantly accumulates due to brake drum rotation.

Figure 8:
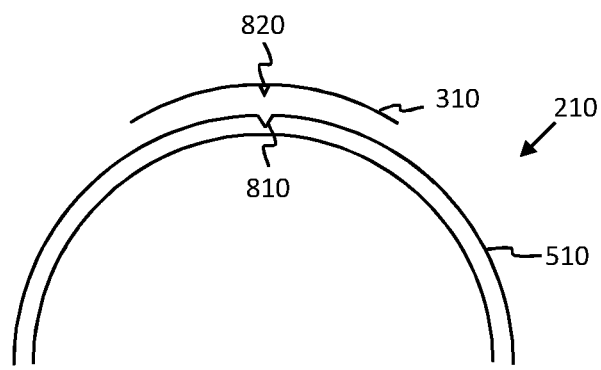
FIG. 8 schematically illustrates an example brake dust trap.

With reference to FIG. 8, according to aspects, the groove 310 comprises at least one protrusion 820 arranged to mate with a corresponding recess 810 configured to extend radially inwards from the brake dust filter 210 perimeter.

Due to the protrusions 820 in the groove 310, a dust trap 210 needs to comprise a set of recesses 810 matching the protrusions 820 in order for it to be fitted. A generic dust trap 210 will not fit into a groove 310 with the protrusions 820. This way it can be ensured that generic dust traps are not used. Also, brake drums can be fitted with protrusions 820 in dependence of, e.g., dimension or brake type. This makes it more difficult to fit an unsuitable dust trap into a brake drum.

Also, as noted above, the drum brake 140 may be arranged to retain the brake dust trap 210 by any of an interference fit mechanism and/or a snap fit mechanism.

The invention claimed is:

1. A brake dust trap for a drum brake, comprising:
an annular structure configured to be received in a circumferential groove that is defined in, and recessed relative to, a braking surface of a drum of the drum brake;
wherein the annular structure is configured to be retained in the circumferential groove, configured to rotate along with the drum, and configured to trap particulate matter generated by the drum brake, and
wherein the annular structure is configured to be removable from the drum brake for disposal of the trapped particulate matter.

2. The brake dust trap of claim 1, wherein the annular structure is configured to be separable into a plurality of segments.

3. The brake dust trap of claim 1, wherein the annular structure is configured to be retained in the circumferential groove by a snap fit mechanism.

4. The brake dust trap of claim 1, wherein the annular structure is configured to be retained in the circumferential groove by an interference fit mechanism.

5. The brake dust trap of claim 1, wherein the annular structure comprises a plurality of protruding portions extending radially inwards from the brake dust trap, spaced apart by indentations.

6. The brake dust trap of claim 1, wherein the annular structure comprises a porous material configured to absorb and to hold particulate matter.

7. The brake dust trap of claim 1, wherein the annular structure comprises a magnetic material configured to attract and to hold magnetic particulate matter.

8. The brake dust trap of claim 1, wherein the annular structure comprises a sticky, adhesive, or viscid surface portion configured to adhere to and to hold particulate matter.

9. The brake dust trap of claim 1, wherein the annular structure comprises one or more recesses extending radially inwards from a perimeter of the annular structure to match and to mate with corresponding protrusions formed in the circumferential groove.

10. The brake dust trap of claim 1, wherein the annular structure is configured to be disposed of after use.

11. The brake dust trap of claim 1, wherein the annular structure is configured to be cleaned and re-used regularly.

12. A vehicle comprising:
a brake dust trap, comprising an annular structure, and
a drum brake comprising:
a brake drum having a circumferential groove that is defined in, and recessed relative to, a braking surface of the brake drum,
wherein the annular structure of the brake dust trap is received and retained in the circumferential groove of the drum brake to trap particulate matter generated by the drum brake,
wherein the annular structure is configured to be retained in the circumferential groove to rotate along with the drum, and
wherein the annular structure is configured to be removable from the drum brake for disposal of the trapped particulate matter.

* * * * *